United States Patent Office 3,438,994
Patented Apr. 15, 1969

3,438,994
METHINE DYES CONTAINING TRICYANOALKYL-SUBSTITUTED PHOSPHORUS
Henri Depoorter and Jean Marie Nys, Mortsel-Antwerp, and André Emile Van Dormael, Heverlee-Leuven, Belgium, assignors to Gevaert Photo-Producten N.V., Mortsel, Belgium, a Belgian company
No Drawing. Filed July 6, 1964, Ser. No. 380,678
Claims priority, application Great Britain, July 9, 1963, 27,154/63
Int. Cl. C07f 9/02; C09b 23/04, 23/16
U.S. Cl. 260—304                    4 Claims The present invention relates to new methine dyes and the preparation thereof.

In the Belgian patent specification 583,922 are described methine dyes characterized by the following auxochromophoric system:

$$\underset{/}{\overset{\diagdown}{\text{P}}}=\overset{|}{\text{C}}(\overset{|}{\text{C}}=\overset{|}{\text{C}}-)_y\overset{|}{\text{C}}=X_a \rightleftarrows \underset{/}{\overset{\diagdown}{\text{P}^+}}-\overset{|}{\text{C}}=(\overset{|}{\text{C}}-\overset{|}{\text{C}}=)_y\overset{|}{\text{C}}-X_d$$

wherein: each of $X_a$ and $X_d$ represents an atom of group of atoms, which can readily raise or lower its covalency by one, $X_a$ acting as an electron-acceptor such as a double bound oxygen atom [=O], a quaternary nitrogen atom $$\left[\overset{\diagdown}{\underset{|}{\text{N}}}\diagup^{(+)}\right]$$

or the group $$\underset{/}{\overset{\diagdown}{\text{P}^{(+)}}}-\text{C}=$$

and $X_d$ acting as an electron-donor such as a negatively charged atom [—O$^{(-)}$], a tertiary nitrogen atom $$\left[\overset{\diagdown}{\underset{|}{\text{N}}}\diagup\right]$$

or the group $$\underset{/}{\overset{\diagdown}{\text{P}}}=\overset{|}{\text{C}}-$$

and $y$ represents zero or a positive integer.

A number of methine dyes has now been found, comprising the above-mentioned auxochromophoric system, which is more particularly comprised in the following general formula:

$$\text{R}-\overset{+}{\text{N}}=\overset{\overbrace{\hspace{2cm}}^{\text{Z}}}{(\text{CH}-\text{CH}=)_n\overset{|}{\text{C}}}-\text{CH}=\text{CH}-\overset{\overset{A_1}{|}}{\underset{\diagdown}{\text{C}}}=\text{P}\overset{\diagup \text{R}'}{\underset{\diagdown \text{R}'''_1}{-\text{R}''_1}}\quad X^-$$

(I)

wherein:

Each of $R'_1$, $R''_1$ and $R'''_1$ (the same or two or more of them different) represents a cyano-substituted alkyl radical e.g. a β-cyanoethyl radical, $A_1$ represents an $$\text{alkyl-O.}\underset{\overset{\|}{\text{O}}}{\text{C}}-$$

group, e.g. a carbethoxy group, an acyl group, e.g. benzoyl group, or a cyano group, Z represents the non-metallic atoms to complete a heterocyclic nucleus containing 5 to 6 atoms in the heterocyclic ring such as those of the thiazole series (e.g. thiazole, 4-methylthiazole,
4-phenylthiazole,
5-methylthiazole,
5-phenylthiazole,
4,5-dimethylthiazole,
4,5-diphenylthiazole,
4-(2-thienyl)-thiazole), those of the benzothiazole series (e.g. benzothiazole, 4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
4,5,6,7-tetrahydrobenzothiazole,
5,6-dimethoxybenzothiazole,
5,6-dioxymethylenebenzothiazole,
5-hydroxybenzothiazole,
6-hydroxybenzothiazole,
5,6-dimethylbenzothiazole, those of the naphthothiazole series (e.g.

naphtho[2,1-d]thiazole,
naphthol[1,2-d]thiazole,
5-methoxynaphtho[1,2-d]thiazole,
5-ethoxynaphtho[1,2-d]thiazole,
8-methoxynaptho[2,1-d]thiazole,
7-methoxynaphtho[2,1-d]thiazole), those of the thionaphtheno[7',6'-d]thiazole series (e.g.

4-methoxythionaphthenal[7',6'-d]thiazole), those of the oxazole series (e.g. 4-methyloxazole, 5-methyloxazole,
4-phenyloxazole,
4,5-diphenyloxazole,
4-ethyloxazole,
4,5-dimethyloxazole,
5-phenyloxazole), those of the benzoxazole series (e.g. benzoxazole, 5-chlorobenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
6-methoxybenzoxazole,
5-hydroxybenzoxazole,
6-hydroxy-benzoxazole), those of the thionaphtheno[7',6'-d]thiazole series (e.g. oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole,
5-methoxybenzoselenazole, 5-hydroxybenzoselenazole,
4,5,6,7-tetrahydrobenzoselenazole), those of the naphthoselenazole series (e.g. naphtho[2,1-d]selenazole, naphtho[1,2-d]selenazole), those of the thiazoline series (e.g. thiazoline, 4-methylthiazoline,
4-hydroxymethyl-4-methylthiazoline,
4,4-bis-hydroxymethythiazoline,
4-acetoxymethyl-4-methyliazoline,
4,4-bis-acetoxymethylthiazoline), those of the thiazoline series, those of the oxazoline series (e.g. oxazoline, 4-hydroxymethyl-4-methyloxazoline,
4,4-bis-hydroxymethyloxazoline,
4-acetoxymethyl-4-methyloxazoline,
4,4-bis-acetoxymethyloxazoline), those of the oxazolidine series, those of the selenazoline series (e.g. selenazoline), those of the 2-quinoline series (e.g. the quinoline, 3-methylquinoline,
5-methylquinoline,
7-methylquinoline,
8-methylquinoline,
6-chloroquinoline,
8-chloroquinoline,
6-methoxyquinoline,
6-ethoxyquinoline,
6-hydroxyquinoline,
8-hydroxyquinoline etc.), those of the 4-quinoline series (e.g. quinoline, 6-methoxyquinoline,
7-methylquinoline,
8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine,
3,3,7-trimethylindolenine), those of the pyridine series (e.g. pyridine,
5-methylpyridine), those of the benzimidazole series (e.g. 1-ethylbenzimidazole, 1-phenylbenzimidazole,
1-ethyl-5,6-dichlorobenzimidazole,
1-hydroxyethyl-5,6-dichlorobenzimidazole,
1-ethyl-5-chlorobenzimidazole,
1-ethyl-5,6-dibromobenzimidazole,
1-ethyl-5-chloro-6-aminobenzimidazole,
1-ethyl-5-chloro-6-bromobenzimidazole,
1-ethyl-5-phenylbenzimidazole,
1-ethyl-5-fluorobenzimidazole,
1-ethyl-5-cyanobenzimidazole,
1-(β-acetoxyethyl)-5-cyanobenzimidazole,
1-ethyl-5-chloro-6-cyanobenzimidazole,
1-ethyl-5-fluoro-6-cyanobenzimidazole,
1-ethyl-5-acetyl-benzimidazole,
1-ethyl-5-chloro-6-fluorobenzimidazole,
1-ethyl-5-carboxybenzimidazole,
1-ethyl-7-carboxybenzimidazole,
1-ethyl-5-carbethoxybenzimidazole,
1-ethyl-7-carbethoxybenzimidazole,
1-ethyl-5-sulphamylbenzimidazole,
or 1-ethyl-5-N-ethylsulphamylbenzimidazole).

R represents an alkyl radical,
a substituted alkyl radical,
e.g. a halogen-substituted alkyl,
a cyano-substituted alkyl,
a hydroxyalkyl radical,
an alkoxyalkyl radical,
an acyloxyalkyl radical,
a carbalkoxyalkyl radical,
an acylalkyl radical,
a hydroxyalkoxy alkyl radical,
an alkoxy alkoxyalkyl radical,
a cyclo alkyl radical,
a substituted cyclo alkyl radical,
an aryl radical,
a substituted aryl radical,
an aralkyl radical,
a substituted aralkyl radical or a group forming a betaine-like structure with the hetero-nitrogen atom whereupon R is bound,
such as a carboxyalkyl radical, e.g. a carboxyethyl radical,
a carboxyaryl radical e.g. of a carboxyphenyl radical,
a carboxyaralkyl radical e.g. a carboxybenzyl radical,
a —L—O—SO$_3$H group,
a —L—SO$_2$OH group, a

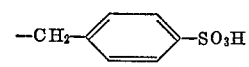

group, a

group, a

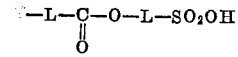

group, a

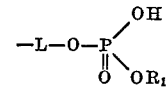

group, a

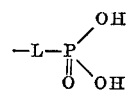

group, a

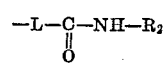

group, a

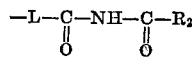

group, a

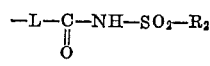

group, a

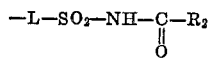

group, a

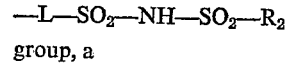

group, a

—L—NH—SO$_2$—R$_2$ group or a —L—SO$_2$—NH—R$_2$ group, wherein L represents an alkylene radical such as a —(CH$_2$)$_q$— radical wherein $q$ represents a positive integer from 1 to 4, or a substituted alkylene radical, $R_1$ represents a hydrogen atom, an alkyl radical,
a substituted alkyl radical,
a cycloalkyl radical,
a substituted cycloalkyl radical,
an aryl radical,
a substituted aryl radical,
an aralkyl radical,
or a substituted arlkyl radical, and $R_2$ represents a hydrogen atom,
an alkyl radical,
a substituted alkyl radical,
a cycloalkyl radical,
a substituted cycloalkyl radical,
an aryl radical,
a substituted aryl radical,
an aralkyl radical,
a substituted aralkyl radical,
an amino group or a substituted amino group,
$n$ is 0 or 1, and
$X^-$ represents an acid radical of a type used in methine dyes e.g. chloride, bromide, iodide, percholate, benzene sulphonate, p-tolusulphonate, methyl sulphate, ethyl sulphate, or propylsulphate.

The dyes of this type are optical sensitizers for silver halide emulsions and also for electrophotographic materials comprising a photoconductive layer containing one or more photoconductive compounds e.g. zinc oxide.

The new methine dyes are particularly useful for enhancing the spectral sensitivity of gelatino silver halide emulsions wherein the staining effect of the sensitizing dyes after processing has to be very low. The presence in processed photographic material of residual stain due to sensitizing dyes is particularly troublesome in photographic materials used in photomechanical processes for graphic reproduction purposes. For example in the use of photographic negatives of the lithographic type which are to be corrected by a colour mask image, a neutral tint of the negative is required.

The staining effect in processed photographic silver halide emulsions of the methine dyes according to the present invention is so low that it is not necessary to introduce into the molecule of the methine dye on the nitrogen atom of the heterocyclic nucleus an organic residue especially useful for reducing the residual staining such as e.g. described in the United Kingdom patent specifications 886,271 and 904,332.

The methine dyes of the present invention can be prepared by condensating a phosphonium salt according to Formula II or its corresponding phosphorane compound represented by Formula III:

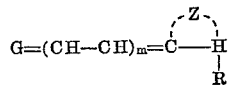

wherein $A_1$, $R'_1$, $R''_1$, $R'''_1$ and $X^-$ have the same significance as in the general Formula I, with an electrophilic methine dye intermediate capable of reacting with a compound containing a reactive methylene or substituted methylene group.

As methine dye intermediate compounds capable of reacting with a methylene phosponium salt or a methylene phosphorane compound corresponding respectively to Formulae II and III can be mentioned:

(a) 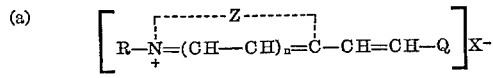

wherein:
Q represents an anilido group e.g. a

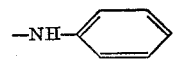

group, a

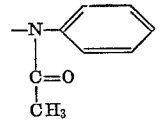

group or a

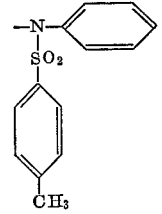

group, a halogen atom such as a chlorine atom, an alkoxy group e.g. a $CH_3$—O— group, an aryloxy group e.g. a

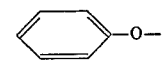

group, an alkylmercapto group e.g. a $CH_3$—S— group or an arylmercapto group e.g. a

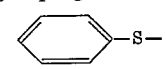

group, and
R, $X^-$, $n$ and Z have the same significance as described in the general Formula I.

(b) 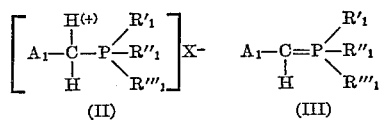

wherein:
G represents a reactive functional group e.g. an oxygen atom, a sulphur atom, a selenium atom or an imino group such as a phenyl imino group, and
R and Z have the same significance as described in general Formula I.

The condensation reaction with the methine dye intermediates mentioned under (a) and (b) are chemically generic or equivalent since the condensation in all cases proceeds with a quaternary salt.

In the case a compound mentioned under (a) is used, it is very clear that the reaction proceeds with a quaternary salt. In the case, however, the reaction proceeds with the methine dye intermediate mentioned under (b), the quaternary salt has to be formed "in situ" during the reaction, by carrying out the condensation in the presence of an acidic compound e.g. acetic acid or a compound which forms an acid medium during the reaction e.g. an acid anhydride such as acetic anhydride.

The condensation can be carried out in the presence of an inert diluent such as methanol, or ethanol and occasionally but not necessarily in the presence of a basic condensing agent e.g. pyridine, piperidine, triethylamine.

The preparation of some phosphonium salts corresponding to Formula II and some methylene phosphorane compounds corresponding to Formula III is given hereinafter.

Tris (2-cyanoethyl) phosphine represented by the structural formula:

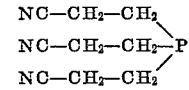

is prepared according to J. Am. Chem. Soc. 81, 1105 (1959).

Phenacyl tris (2-cyanoethyl) phosphonium chloride represented by the structural formula:

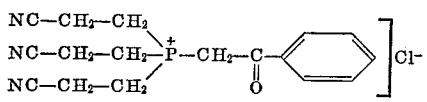

is prepared as follows:

Phenacyl chloride (5 g.) is added while stirring to tris (2-cyanoethyl) phosphine (6.1 g.) in acetonitrile (10 ccs.). The mixture is heated on a water bath for 6 hours and the phosphonium salt is collected by sucking off, after adding some acetone. Melting point: 160° C.

Carbethoxymethyl - tris(2 - cyanoethyl)phosphonium bromide represented by the structural formula:

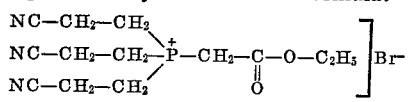

is prepared in the same way as phenacyl-tris(2-cyanoethyl)phosphonium chloride but starting from tris(2-cyanoethyl)phosphine (11.6 g.), ethyl bromoacetate (10 g.) in acetonitrile (30 ccs.). Melting point: 169° C.

Cyanomethyl-tris(2-cyanoethyl)phosphonium chloride represented by the structural formula:

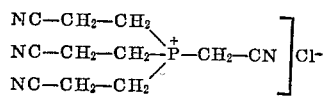

is prepared in the same way as phenacyl-tris(2-cyanoethyl)phosphonium chloride but starting from tris(2-cyanoethyl)phosphine (6.1 g.), chloroacetonitrile (2.4 g.) in acetonitrile (10 ccs.). Melting point: 180° C.

Benzoylmethylene - tris(2 - cyanoethyl)phosphorane represented by the structural formula:

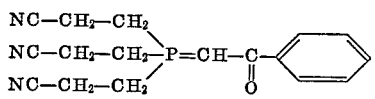

is prepared as follows:

A solution of sodium metal (0.27 g.) in ethanol is added, while stirring, to phenacyl-tris(2-cyanoethyl) phosphonium chloride (3.5 g.) in ethanol (50 ccs.) Sodium chloride is formed and filtered off. The filtrate is evaporated and the residue washed with water. Melting point: 150° C.

The following examples give a more detailed description of some methods for preparing the new methine dyes. These examples are not to be considered as limiting the scope of our invention but merely as a survey of the most usual condensation methods. After each description of the preparation, an example is given of the optical sensitizing influence of the dye on a usual light-sensitive silver halide emulsion.

Example 1

The methine dye of the formula:

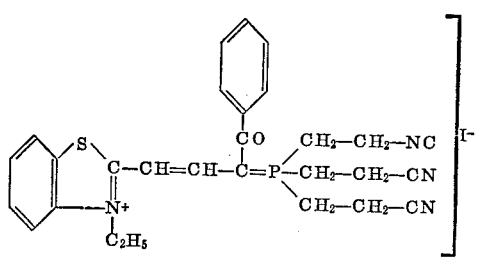

is prepared as follows:

2 - (β - phenyliminoethylidene)-3-ethyl - 2,3 - dihydrobenzothiazole (14 g.), phenacyl-tris(2-cyanoethyl)-phosphonium chloride (17.5 g.) and acetic anhydride (25 ccs.) are mixed at 0° C. and kept overnight at this temperature. The dye is precipitated with ether and converted into iodide by dissolving in ethanol and pouring into an ethanolic potassium iodide solution. Purification is performed by crystallizing once from ethanol-ether and once from ethanol-monomethylglycolether. Melting point: 197° C. Abs. max.: 459 mμ.

50 mg. of this dyestuff was incorporated in 1 kg. of a silver chloride-iodide emulsion. A sensitizing maximum at about 480 mμ was observed.

Example 2

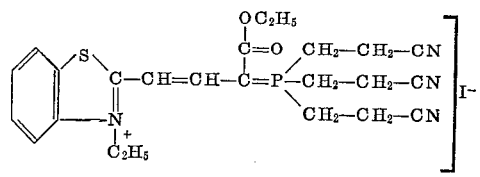

Carbethoxy methyl - tris(2 - cyanoethyl)phosphonium bromide (10.8 g.), 2-(β-phenyliminoethylidene)-3-ethyl-2,3-dihydrobenzothiazole (8.4 g.) and acetic anhydride (50 ccs.) are kept for 2 hours at 0° C. and poured into an aqueous potassium iodide solution. The dye is collected, washed thoroughly with water and recrystallized twice from ethanol and once from monomethylglycolether. Melting point: 222° C. Abs. max.: 441 mμ.

50 mg. of this dyestuff was incorporated in 1 kg. of a silver chloride emulsion. A sensitizing maximum at about 480 mμ was observed.

Example 3

The methine dye of the formula:

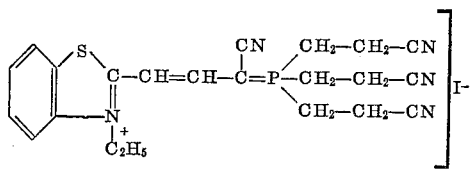

Cyanomethyl-tris(2 - cyanoethyl)phosphonium chloride (2.8 g.), 2(β-phenyliminoethylidene)-3-ethyl-2,3-dihydrobenzothiazole (2.7 g.) and acetic anhydride (10 ccs.) are allowed to react and purified as described for the dyestuff of Example 1. Melting point: 222° C. Abs. max.: 444 mμ.

To 1 kg. of a silver chloride emulsion were added 50 mg. of this dyestuff. A strong sensitization with a maximum at 475 mμ was observed.

Example 4

A dispersion of zinc oxide (3.7 moles ZnO/liter) in toluene and copoly(vinylacetate-vinyl laurate) (85:15) (20% by weight calculated on the weight of zinc oxide) and monobutyl phosphate (1% by weight calculated on the weight of zinc oxide) is divided in 4 equal portions. To these zinc oxide dispersions are added the amounts of sensitizing agent mentioned further on, with which an optimal spectral sensitivity of the charged zinc oxide is obtained.

The zinc oxide dispersions are then applied to a paper support pro rata of 0.25 mole of ZnO per sq. m. The layers thus obtained are charged with a corona and exposed under identical conditions through a step-wedge. After developing of the latent image with a triboelectrically charged powder, the relative sensitivities listed in the table are measured.

The sensitization maxima are determined from a reflection curve of the cast material.

| Test No. | Dye used in— | Millimole of dye/mole of zinc oxide | Relative sensitivity | Sens. max. (nm.) |
|---|---|---|---|---|
| 2 | Example 1 | 0.065 | 100 1,500 | 458 |
| 3 | Example 2 | 0.070 | 700 | 455 |

We claim:
1. A methine dye salt corresponding to the following general formula:

(I) 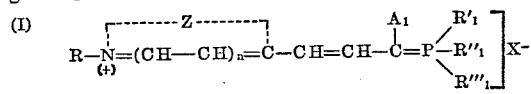

wherein:
$R'_1$, $R''_1$ and $R'''_1$ are identical and each is a cyano-substituted lower alkyl radical,
$A_1$ is a member selected from the group consisting of carbloweralkoxy, cyano and benzoyl,
Z represents the non-metallic atoms necessary to complete a heterocylic nucleus selected from the group consisting of those of the thiazole series, benzothiazole series, naphthothiazole series, thionaphthenothiazole series, oxazole series, benzoxazole series, naphthoxazole series, selenazole series, benzoselenazole series, naphthoselenazole series, thiazoline series, thiazolidine series, oxazoline series, 2-quinoline series, 4-quinoline series, 1-isoquinoline series, 3-isoquinoline series, 3,3-dialkylindolenine series, pyridine series and benzimidazole series,
R stands for a member selected from the group consisting of lower alkyl,
$n$ is a number from 0 to 1, and
$X^-$ represents a strong acid radical.

2. A methine dye according to claim 1, wherein each of $R'_1$, $R''_1$ and $R'''_1$ is a β-cyanoethyl group.
3. A methine dye according to claim 1, wherein $A_1$ is a cyano group.
4. A methine dye according to claim 1, having the following formula:

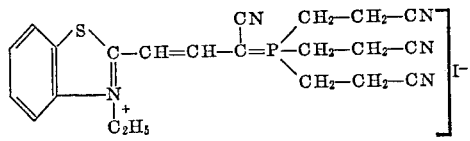

References Cited
UNITED STATES PATENTS
| | | | | |
|---|---|---|---|---|
| 2,737,516 | 3/1956 | Sartori | | 260—304 |
| 2,996,512 | 8/1961 | Stephens | | 260—304 |
| 2,304,981 | 12/1942 | Wilmanns | | 96—106 |
| 2,870,014 | 1/1959 | Brooker et al. | | 96—106 |

ALEX MAZEL, *Primary Examiner.*

R. J. GALLAGHER, *Assistant Examiner.*

U.S. Cl. X.R.

96—106; 260—240, 283, 287, 289, 294.9, 295, 298, 302, 306.7, 307, 309.2, 326.11